Feb. 21, 1933.     F. H. NIES     1,898,094

AMALGAM MIXER OR THE LIKE

Filed April 27, 1931

Inventor
Frederick H. Nies,
By his Attorneys,
Fraser, Myers & Manley

Patented Feb. 21, 1933

1,898,094

UNITED STATES PATENT OFFICE

FREDERICK H. NIES, OF BROOKLYN, NEW YORK

AMALGAM MIXER OR THE LIKE

Application filed April 27, 1931. Serial No. 533,162.

The present invention relates to amalgam mixers or mortar and pestle combinations for use in preparing dental amalgams or other substances requiring mixing or grinding, and aims to provide certain improvements therein.

In the preparation of dental amalgam a suitable alloy in powdered form and mercury are mixed together to provide a union between said ingredients. To insure an amalgam of maximum strength it is important that the ingredients be thoroughly mixed so as to provide complete solution of the alloy in the mercury. This cannot be satisfactorily accomplished by following the conventional practice, according to which the ingredients are either mixed or rubbed in a mortar with an ordinary pestle, or kneaded together by hand. The best that can be accomplished in said manner of procedure is to provide around the undissolved alloy particles as much true amalgam as possible.

According to the present invention I obtain practically complete solution of the alloy in the mercury and thus provide an amalgam which will be homogeneous throughout, and will, upon solidification, possess maximum toughness. This I accomplish by subjecting the constituent ingredients to a thorough mixing and rubbing under pressure in the shortest possible time in an improved mortar and pestle or amalgam mixer of novel design.

In its preferred constructions my amalgam mixer comprises novel forms of pestles for cooperative use with either a standard form of mortar or a novel form of mortar of my design, the details of said parts and their manner of cooperation being hereinafter described in detail.

Various embodiments of my invention are illustrated in the accompanying drawing, wherein Figure 1 is a side elevation of a pestle disposed within a novel form of mortar shown in cross-section, said mortar and pestle embodying features of my invention.

Figure 1:
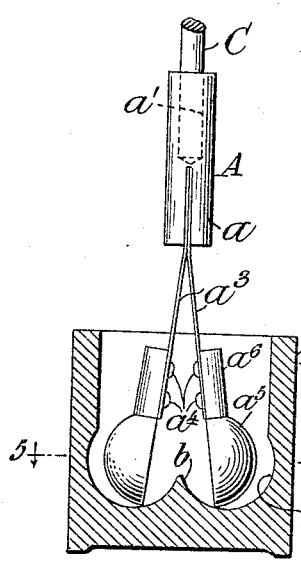
Figures 2, 3:
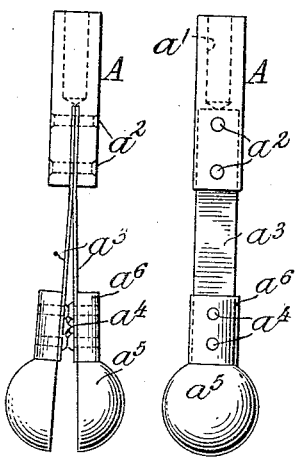
Figs. 2 and 3 are elevations taken at right-angles to each other of the pestle shown in Fig. 1.
Figure 4:
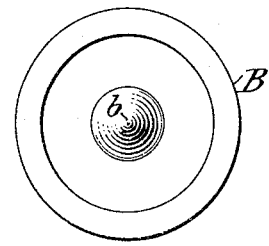
Fig. 4 is a top plan view of the mortar shown in Fig. 1.
Figure 5:
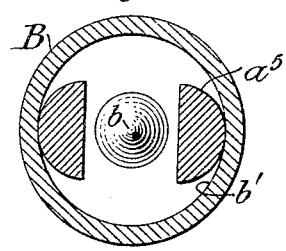
Fig. 5 is a section taken substantially along the plane of the line 5—5 of Fig. 1.
Figure 6:
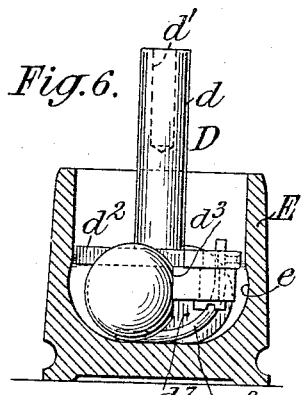
Fig. 6 is a view similar to Fig. 1, showing a modified form of pestle and mortar.
Figure 7:
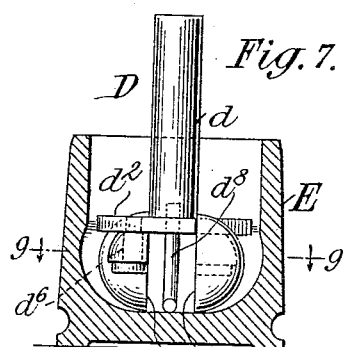
Fig. 7 is a view similar to Fig. 6, taken at right-angles thereto.

Referring first to Figs. 1 to 5 of the drawing, let A indicate the pestle as a whole, and B the mortar. The pestle A consists of a cylindrical supporting shank $a$, one end of which is axially bored, as indicated at $a'$, for attachment to an operating spindle C, and the other end of said shank being diametrically slotted and having secured within said slot through the medium of rivets or the like $a^2$, a pair of spring arms or blades $a^3$. To each free end of the blades $a^3$ there is secured, through the medium of rivets $a^4$ or equivalent means, a substantially hemi-spherical member $a^5$, the flat faces of which are disposed opposite to each other. Each of the members $a^5$ is formed with a shank or extension $a^6$, through which the securing means $a^4$ pass. The blades $a^3$ are preferably bent so as to be divergent, for the purpose which will presently appear.

The mortar B may be of any preferred form, but as herein shown consists of a substantially cylindrical casing which is internally hollowed out into cup-shaped form, the internal bottom of which is formed with a re-entrant, central conical projection $b$. Preferably the internal side wall of the mortar where it merges into the bottom wall is undercut, as indicated at $b'$, so as to provide an annular groove substantially semi-circular in cross section. The outer curved surfaces of the hemi-spherical members $a^5$ are designed to cooperate with the annular wall $b^1$ in a manner which will be presently made apparent.

Referring now to Figs. 6 to 9, the pestle indicated as a whole by the reference character D comprises a cylindrical shank $d$, the upper end of which is provided with an internal bore $d'$ for attachment to an operating shaft, and the opposite end is provided with a lateral flange $d^2$, which, on opposite sides of the shank, has portions thereof cut away, as indicated at $d^3$, to provide a clearance for the movement of a pair of hemi-spherical members $d^4$, each of which is formed with a lateral extension $d^5$, which extensions are pivoted respectively to diametrically opposite points on the lateral flange $d^2$, as indicated at $d^6$. Also secured to the lateral flange $d^2$ and extending downwardly between the plane faces $d^7$ of the members $d^4$, and preferably substantially in a diametrical plane passing through the axis of the shank D, is a curved element $d^8$, the bottom edge of which is substantially flush with the bottom edges of the members $d^4$.

The pestle D is designed to cooperate with a conventional form of mortar but preferably is to be used with a mortar such as E, the internal side wall of which is undercut, as shown at $e$, where it merges with the bottom wall of the mortar. The undercut portion of the wall is preferably of curved cross-section to cooperate with the curved outer walls of the members $d^4$.

Figure 10:
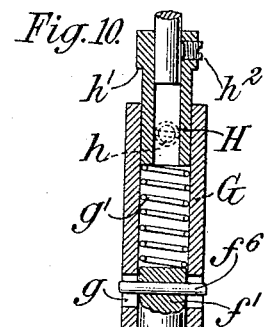
Fig. 10 is a side elevation partly in section, showing still another form which the pestle of my invention may take.
Figure 11:
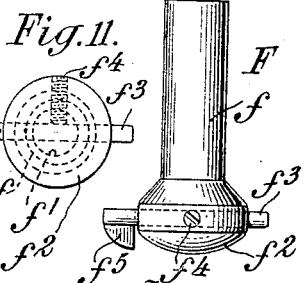
Fig. 11 is a bottom plan view of the pestle shown in Fig. 10.
Figure 8:
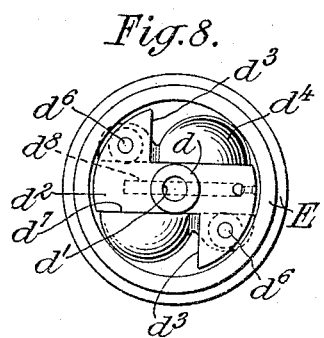
Fig. 8 is a top plan view of the mortar and pestle shown in Fig. 6.
Figure 9:
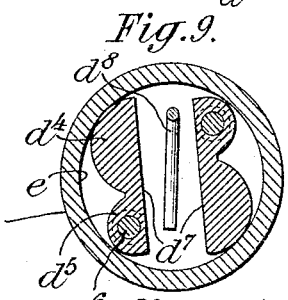
Fig. 9 is a section taken substantially along the plane of the line 9—9 of Fig. 7.

In Figs. 10 and 11 I have shown still another embodiment of pestle construction embodying my invention. According to this form the pestle F consists of a cylindrical shank $f$, one end of which is formed with an offset or eccentrically-disposed stud $f'$, and the opposite end of which is provided with an enlarged head $f^2$ having a rounded bottom, as is conventional. Extending diametrically through the head $f^2$ is a pin $f^3$ which is adjustable in said head through the medium of a set screw $f^4$. One end of said pin is provided with an arcuate blade or wing $f^5$, the outer edge of which is curved inwardly toward the head of the pestle and extends downwardly to a point slightly above the bottom face of the head. Secured to the stud $f'$ through the medium of a pin $f^6$ is a sleeve G which is adapted for relative axial movement with respect to the pestle shank, through the medium of the longitudinal slots $g$ through which the pin $f^6$ extends. Within the sleeve G is disposed a helical spring $g'$, one end of which abuts against the end of the shank stud $f'$, and the other end of which abuts against the bottom of a tubular bushing H and is held under partial compression thereby. The tubular bushing H is held within the sleeve G by a set screw $h$ and is formed at its outer end with an outwardly-extending flange $h'$, through which extends a set screw $h^2$ for securing the pestle to an operating shaft.

The shanks $a$ and $d$ of the pestles A and D, respectively, it will be understood, can likewise be resiliently mounted with respect to the supporting shaft in a manner similar to that of pestle F.

In the use of my amalgam mixer as hereinbefore described, the pestle can be suitably mounted for rotation by being connected directly to the flexible shaft of a dental engine, to a separate electric motor or other suitable source of motive power.

In the preparation of dental amalgam for making one or more fillings, a dentist will place the requisite amounts of alloy and mercury within a mortar, insert the pestle in the mortar, and start the pestle rotating. Where a mortar and pestle combination such as shown in Figs. 1 to 5 is employed, the rotation of the pestle at a high rate of speed will cause the hemi-spherical balls to be thrown outwardly by centrifugal force against the curved wall $b'$, and in their outward movement, the members $a^5$ will carry with them the substance to be mixed and will thoroughly mix and rub them together to provide a perfect amalgam in a very short time. In the course of this mixing or rubbing action it will be understood that there is a slight downward pressure upon the pestle within the mortar which may be provided by resiliently mounting the pestle in the manner shown in Fig. 10, or otherwise. If desired, the spring blades $a^3$ may have an initial divergence such as will exert a normal outward pressure on the wall of the mortar, in which case the pestle may be rotated relatively slowly and function effectively to thoroughly mix the amalgam. The central re-entrant projection $b$ will prevent the formation of a dead center within the mortar whereat the substances to be mixed would not obtain the benefit of the mixing action of the pestle. Where a mortar and pestle combination such as shown in Figs. 6 to 9 is employed, the procedure in preparing dental amalgam is exactly the same as that aforementioned, and the action is somewhat similar in that the hemi-spherical members $d^4$ are thrown outwardly by the centrifugal force of the rotating pestle to engage the curved wall $e$ of the mortar, and to these thoroughly mix and rub together the ingredients constituting the amalgam. The curved element $d^8$ will prevent the formation of a dead center in the bottom of the mortar whereat the substances being acted upon might otherwise lie unacted upon by the hemi-spherical members. It will be apparent that as the pestle is rotated at high speed the element $a^8$ will likewise be rotating and will tend to throw the substances being treated, outwardly into the path of the engaging surfaces of the mortar and pestle. In the use of a pestle such as F with a mortar such as E, or with a conventional mortar, the wing $f^5$ will function to return the substances being treated which have been thrown outwardly by the centrifugal force of the pestle, back into the circular path described by the pestle head for mixing and rubbing action between said head and mortar bottom. The pestle F being eccentrically mounted, it will be evident that the head F will describe a circle of larger diameter than that of the head $f^2$, and because of the adjustability of the pin $f^3$ in the head of the pestle F, it will be apparent that said pestle is adapted for use in mortars of varying diameter.

From the foregoing detailed description it will be apparent that by the use of mortar and pestle combinations such as I have invented, the complete solution of the alloy in the mercury to provide thorough, homogeneous amalgams will uniformly result, thereby enabling dentists to obtain in the shortest possible time, perfect amalgams, which heretofore have been difficult of realization.

While I have shown and described certain preferred embodiments of my invention, I do not wish to be limited to the specific details of construction disclosed, since it will be apparent to one skilled in the art that these details may be varied without departing from the spirit of my invention.

What I claim is:

1. An amalgam mixer or the like, comprising a mortar having a wall which is circular on its inner face and which has a rounded surface between said wall and bottom and a rotatable pestle having a plurality of relatively movable members which are mounted to exert an outward pressure against the wall of the mortar when the pestle is rotated, the outer surface of the pestle members being rounded in the direction of their rotation and of complemental shape to the rounded surface between said wall and bottom of the mortar at their points of engagement therewith when pressed thereagainst, whereby rotation of the pestle causes a wedging or smearing action of the material acted upon between the pestle and the mortar.

2. An amalgam mixer or the like, comprising a mortar having a wall which is circular on its inner face and which has a rounded surface between said wall and bottom and a rotatable pestle having a plurality of relatively movable members which are mounted to exert an outward pressure against the wall of the mortar when the pestle is rotated, the outer surface of the pestle members being rounded in the direction of their rotation and of complemental shape to the rounded surface between said wall and bottom of the mortar at their points of engagement therewith when pressed thereagainst, and means for preventing the formation of a dead center in the mortar where the substance being acted upon may escape the rubbing or grinding action of the pestle.

3. An amalgam mixer or the like, comprising a mortar having a wall which is circular on its inner face and which has a rounded surface between said wall and bottom and a rotatable pestle having a plurality of relatively movable members which are mounted to exert an outward pressure against the wall of the mortar when the pestle is rotated, the outer surface of the pestle members being rounded in the direction of their rotation and of complemental shape to the rounded surface between said wall and bottom of the mortar at their points of engagement therewith when pressed thereagainst, and an element on the pestle adapted to engage the bottom of the mortar for moving the substance being acted upon into the path of the relatively movable pestle members.

4. An amalgam mixer or the like, comprising a mortar having a wall which is circular on its inner face and which has a rounded surface between said wall and bottom and a rotatable pestle having a plurality of relatively movable members which are mounted to exert an outward pressure against the wall of the mortar when the pestle is rotated, the outer surface of the pestle members being rounded in the direction of their rotation and of complemental shape to the rounded surface between said wall and bottom of the mortar at their points of engagement therewith when pressed thereagainst, and said mortar having a central raised projection on its bottom.

5. An amalgam mixer or the like, comprising a mortar having a substantially cylindrical inner wall and a bottom providing at its juncture with the inner wall an annular surface of arcuate cross-section, and a rotatable pestle having a plurality of resiliently mounted, relatively movable members with substantially spherical outer faces of the same curvature as the arcuate cross-section of the mortar, said pestle members being mounted to exert an outward pressure against said mortar wall portion of arcuate cross-section when the pestle is rotated.

6. An amalgam mixer or the like, comprising a mortar having a substantially cylindrical inner wall and a bottom providing at its juncture with the inner wall a substantially semi-circular undercut groove, and a rotatable pestle having a plurality of resiliently mounted, relatively movable members with substantially spherical outer faces adapted to exert an outward pressure against the wall of the undercut groove in the mortar.

7. An amalgam mixer or the like, comprising a pestle having a shank and a pair of members carried thereby which are movable outwardly in response to centrifugal force acting thereon, said members being mounted on pivots extending substantially parallel to the axis of the pestle shank and having portions thereof formed with substantially spherical outer faces.

In witness whereof, I have hereunto signed my name.

FREDERICK H. NIES.